United States Patent [19]

Stekoll

[11] 4,126,439
[45] Nov. 21, 1978

[54] ENCAPSULATED FERTILIZER
[76] Inventor: Marion H. Stekoll, 1092 Florence Way, Campbell, Calif. 95008
[21] Appl. No.: 820,921
[22] Filed: Aug. 1, 1977
[51] Int. Cl.$^2$ .............................................. C05F 1/00
[52] U.S. Cl. ..................................... 71/16; 71/64 C; 71/64 F
[58] Field of Search ................. 71/16, 64 C, 64 F; 424/37

[56] References Cited
U.S. PATENT DOCUMENTS

| | | | |
|---|---|---|---|
| 1,413,200 | 4/1922 | Thompson | 71/16 |
| 2,091,993 | 9/1937 | Jones | 71/16 |
| 2,117,808 | 5/1938 | Jones | 71/16 |
| 2,990,333 | 6/1961 | Graham | 424/37 |
| 3,326,756 | 6/1967 | O'Hollaren | 424/37 |

OTHER PUBLICATIONS

*McCutcheon's Detergents and Emulsifiers*, 1975, pp. 66 and 153.

*Primary Examiner*—S. Leon Bashore
*Assistant Examiner*—Chris Konkol
*Attorney, Agent, or Firm*—Limbach, Limbach & Sutton

[57] ABSTRACT

A fertilizer product is disclosed which comprises the use of a fish emulsion encased in a water soluble capsule. The fertilizer product is prepared by concentrating the fish emulsion to evaporate most of the water found therein such that the emulsion will not cause the water soluble capsule to dissolve. To this concentrate, is added a liquifying agent and a surfactant which are blended and placed within the capsule.

16 Claims, No Drawings

ENCAPSULATED FERTILIZER

BACKGROUND OF THE INVENTION

The use of fish emulsion solutions in fertilizing various forms of plant life is well known. Fish emulsion solutions are desirable in this regard because of their organic nature, relatively high nitrogen, phosphoric acid and potash content, plant compatability, easy availability and corresponding low cost.

Generally, a fish emulsion consisting of at least 50% by volume of water is added to common plant life which substantially aids in providing nutrients to the plant, particularly nitrogen, phosphoric acid and potash. Distinct advantages in using a fish emulsion solution, particularly for house plants, are the extremely unpleasant odor associated with such materials, plus the difficulty in accurately measuring the viscous material. Furthermore, the commonly used fish emulsion solutions tend to drain quickly through the soil of a potted plant resulting in rapid dissipation and lack of substantial contact between the fish emulsion solution and the root structure of the plant.

It is thus an object of the invention to eliminate the above-recited drawbacks in the use of fish emulsion solutions to fertilize plant life.

It is a further object of the present invention to convert a fish emulsion solution to a form which can be used to fertilize a plant without the attendant odors normally associated with these materials.

It is yet another object of the present invention to provide a fish emulsion solution which can be maintained within the vicinity of the plant root structure for extended period of time.

It is yet another object of the present invention to provide a fish emulsion solution in a water soluble capsule for insertion into soil surrounding the root structure of a plant as an expedient in fertilizing the plant with the fish emulsion.

SUMMARY OF THE INVENTION

Fish emulsions are generally shipped and stored in a water based solution containing approximately 50% water by weight. If this emulsion were to be placed directly in a water soluble capsule, the shelf life of the capsule would be extremely short and the product virtually useless as a fertilizing agent. The capsule, generally composed of gelatin, is configured for this use to hold approximately 1 CC of material. Thus, if the fish emulsion were not concentrated, the capsule not only would deteriorate rapidly due to attack by water in the emulsion, but would also not contain enough of the fish emulsion nutrients to effectively fertilize the plant root structure. When drying the fish emulsion solution in order to concentrate and dehydrate the same, it was found that dehydration to complete dryness at high temperatures destroyed the fertilizing properties of the emulsion. Thus, as part of the present invention, it has been discovered that the fish emulsion solution is to be dried at relatively low temperatures to maintain the fertilizing properties of the composition and yet not destroy the water soluble capsule enclosing the same. In order to produce a fertilizer product of a more manageable form for filling the gelatin capsules, it has been discovered that the fish emulsion composition should include a liquifying agent and surfactants. More specifically, the liquifying agent can include oils such as soybean oil and the surfactant can be any material commonly employed as such, for example, Atmos 300 which comprises mono and diglycerides of fat forming fatty acids, and polysorbate 80 which is a polyoxyethylene fatty acid ester. Furthermore, the fertilizer product of the present invention can contain up to about 1% lecithin. In terms of percentages of each material, it has generally been found that a fertilizer product produced according to the present invention should contain approximately 74% to 82% by volume of concentrated fish emulsion, approximately 15% to 20% by volume of a liquifying agent and approximately 3% to 6% by volume of a surfactant. Optimally, the fertilizer product of the present invention should comprise approximately 75% by volume concentrated fish emulsion, approximately 20% by volume soybean oil and approximately 5% by volume of a surfactant such as Atmos 300 which comprises mono and di-glycerides of fat forming fatty acids and polysorbate 80 which is a polyoxyethylene fatty acid ester.

The present invention will be more readily appreciated in view of the following working examples.

EXAMPLE 1

A fish emulsion solution composed of 50% water by weight and containing at least 5% nitrogen, 1% phosphoric acid and 1% potash was placed on trays in an evaporator oven. The oven was set for 100°–125° F. for 24 hours while stirring the solution occassionally to allow water to be driven off. After the dehydration step is completed, the concentrated fish emulsion is composed primarily of oils and fish solubles which will later be used for capsule filling. Virtually all of the water originally found in the emulsion solution has been driven off for, as stated previously, the emulsion will later be placed in gelatin capsules which are water soluble and would thus be destroyed if a substantial amount of water was left in the fish emulsion solution.

The concentrated fish emulsion is blended with surfactants and a liquifying agent to a homogenized condition. The percent by volume of each item is as follows:
1. Approximately 75% concentrated fish emulsion.
2. Approximately 20% soybean oil, ± 1% lecithin.
3. 0.5% surfactant (such as Atmos 300 and polysorbate 80).

The above recited composition is reduced to a homogenized condition by using a high speed blender. The homogenized concentrated fish emulsion composition is injected into 1 CC round gelatin capsules and the capsules sealed.

EXAMPLE 2

Gelatin capsules containing the composition produced in Example 1 were tested as follows.

Fifteen plastic 6 inch pots with attached saucers were filled with vermiculite soil. Vermiculite contains no nutrients. Each pot was filled to approximately one-half inch from the top and wet with approximately 9 ounces of water. Radish seeds were then planted in each pot in holes three-quarters of an inch deep.

Each pot containing the radish seeds was watered every other day for approximately 10 days resulting in plants of approximately 1-3 inches in height with 2 small leaves on each stem in all pots. In 5 pots, a gelatin capsule, such as that known by the trademark LILY #000 was filled with the concentrated emulsion of Example 1 and placed in the center of each pot. In 5 other pots, fertilization was accomplished by dissolving a capsule in 9 ounces of water and applying the dissolved fish emulsion fertilizer to each pot. In the last 5 pots, no fertilizer was employed.

In carrying out the above procedure, 3 test groups were prepared consisting of 5 pots per group, each pot containing vermiculite and radish seeds. The first group contained one gelatin capsule per pot, the second group contained its equivalent of a dissolved gelatin capsule in 9 ounces of water per pot while the third group contained no fertilizer. Each pot was watered about once a week and exposed to an identical environment of sunlight, etc.

Within a month, differences in the growth rate in each group were clearly discernible. In the controlled group with no fertilizer, the radish plants were bearly alive. In the controlled group where the fish emulsion fertilizer was added in a conventional manner by first dissolving the gelatin capsule in water, the radish plants were healthy but growth was not vigorous. In the controlled group where the fish emulsion fertilizer was added according to the present invention, the radish plants were robust and thick. Only the radish plants in this latter group exhibited radish growth within 5 weeks of planting. Both the unfertilized and conventionally fertilized radish plants showed no radishes during the first 1½ months of growth.

It can be seen that by practicing the present invention, the benefits of using a fish emulsion composition are achieved, e.g., a low cost fertilizer containing large amounts of nitrogen, phosphoric acid and potash, without the unpleasant side effects of the traditional unpleasant odor associated with the composition. Furthermore, by practicing the present invention, the fish emulsion composition is kept in the vicinity of the root structure of the plant for a longer period of time than was traditionally realized by merely pouring a water soluble emulsion into the plant soil. This results in a more beneficial fertilizing action than was ever appreciated before.

Due to the highly viscous nature of the concentrated fish emulsion in the capsule, water dissolves it slowly at each watering and causes a small amount of fertilizer to migrate through the soil in a comparatively constant manner.

While a desirable embodiment of the invention has herein been illustrated and described by way of example, it is to be understood that the invention is broadly inclusive of any and all modifications falling within the scope of the appended claims.

I claim:

1. A fertilizer product comprising a fertilizing amount of a fish emulsion composition encased in a water soluble capsule wherein said fish emulsion composition comprises approximately 74% to 82% by volume concentrated fish emulsion containing insufficient water content to dissolve the water soluble capsule, approximately 15% to 20% by volume of a liquifying agent and approximately 3% to 6% of a surfactant.

2. The fertilizer product of claim 1 wherein said liquifying agent is soy bean oil.

3. The fertilizer product of claim 1 wherein said surfactant is selected from the group consisting of mono and diglycerides of fat forming fatty acids and polyoxyethylene fatty acid esters.

4. The fertilizer product of claim 1 further comprising up to 1% lecithin.

5. A fertilizer product comprising a fertilizing amount of a fish emulsion composition encased in a water soluble capsule, said fish emulsion composition comprising approximately 75% by volume concentrated fish emulsion containing insufficient water content to dissolve the water soluble capsule, approximately 20% by volume liquifying agent and approximately 5% by volume of a surfactant.

6. The fertilizer product of claim 5 wherein said liquifying agent is soy bean oil.

7. The fertilizer product of claim 5 wherein said surfactant is selected from the group consisting of mono and diglycerides of fat forming fatty acids and polyoxyethylene fatty acid esters.

8. The fertilizer product of claim 5 wherein said water soluble capsule is approximately 1 cc. size gelatin capsule.

9. A method of producing a fertilizer product comprising a fertilizing amount of a fish emulsion composition encased in a water soluble capsule comprising:
  A. concentrating the fish emulsion to constitute approximately 74–82% by volume by evaporating a sufficient quantity of water to prevent said water soluble capsule from dissolving but not to complete dryness;
  B. adding a liquifying agent to constitute approximately 15–20% by volume;
  C. adding a surfactant to constitute approximately 3 to 6% by volume, and
  D. blending the mixture and adding it to a water soluble capsule.

10. The method of claim 9 wherein said fish emulsion is concentrated in an evaporator oven for approximately 24 hours at 100°–125° F. to drive off a substantial amount of water.

11. The method of claim 10 wherein said fish emulsion remains in a liquid state after completion of said drying operation.

12. The method of claim 9 wherein said liquifying agent is soy bean oil.

13. The method of claim 9 wherein said surfactant is selected from the group consisting of mono and diglycerides of fat forming fatty acids and polyoxyethylene fatty acid esters.

14. The method of claim 9 wherein said fertilizer product further contains up to 1% lecithin.

15. A method of fertilizing plants comprising:
  A. embedding in the soil of said plants in proximity to the plants' root structure the fertilizer product of claim 1; and
  B. watering the soil to dissolve said capsule to release said fertilizer.

16. The method of claim 15 wherein said soluble capsule comprises gelatin.

* * * * *